(12) United States Patent
Lee et al.

(10) Patent No.: US 11,745,713 B2
(45) Date of Patent: Sep. 5, 2023

(54) ELECTRIC BOOSTER FOR AUTONOMOUS VEHICLE HAVING DUAL ACTUATOR

(71) Applicants: Hyundai Motor Company, Seoul (KR); Kia Motors Corporation, Seoul (KR)

(72) Inventors: Joung-Hee Lee, Gyeonggi-do (KR); Ung-Hee Shin, Jeollanam-do (KR); Jae-Hun Shim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 291 days.

(21) Appl. No.: 17/026,863

(22) Filed: Sep. 21, 2020

(65) Prior Publication Data
US 2021/0354677 A1    Nov. 18, 2021

(30) Foreign Application Priority Data

May 18, 2020    (KR) .................. 10-2020-0058899

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/4077* (2013.01); *B60T 13/686* (2013.01);
(Continued)

(58) Field of Classification Search
CPC .. B60T 13/74; B60T 13/745; B60T 2270/402; B60T 2270/413; B60T 2270/82; B60T 7/042; B60T 8/4077; F16D 2121/24
See application file for complete search history.

(56) References Cited

U.S. PATENT DOCUMENTS 6,179,097 B1 * 1/2001 Schumann .............. F16D 65/18
                                                                188/162
6,189,661 B1 * 2/2001 Schaffer .................. F16D 65/18
                                                              188/72.8
(Continued)

FOREIGN PATENT DOCUMENTS

KR    10-2019-0136207 A    12/2019

*Primary Examiner* — Bradley T King
(74) *Attorney, Agent, or Firm* — Fox Rothschild LLP

(57) ABSTRACT

An electric brake booster for an autonomous vehicle is provided. The electric brake booster includes a body part that receives a power cylinder generating braking pressure in an autonomous driving/braking mode and a master cylinder generating braking pressure in a manual driver braking mode. A driving shaft is movable in an axial direction in the power cylinder and coupled to a piston. A first motor is connected to a first side of the driving shaft and provides driving power thereto. A second motor is connected to a second side of the driving shaft and provides driving power thereto in a direction equal to that of the driving power provided from the first motor. A controller determines whether the first or second motor normally operates and simultaneously or separately operates the first and second motors based on a magnitude of the pressure in the power cylinder or whether emergency braking occurs.

14 Claims, 3 Drawing Sheets

(51) Int. Cl.
    *B60T 13/68*    (2006.01)
    *B60T 8/40*    (2006.01)
(52) U.S. Cl.
    CPC ....... *B60T 2220/04* (2013.01); *B60Y 2400/81* (2013.01)

(56) References Cited

U.S. PATENT DOCUMENTS

| | | | |
|---|---|---|---|
| 2003/0024245 A1* | 2/2003 | Fulks | B60T 13/745 60/545 |
| 2009/0115247 A1* | 5/2009 | Leiber | B60T 8/5075 303/154 |
| 2012/0062024 A1* | 3/2012 | Mahnkopf | B60T 13/745 701/70 |
| 2013/0087417 A1* | 4/2013 | Yu | B60T 13/741 188/72.3 |
| 2016/0339890 A1* | 11/2016 | Cann | B60T 13/745 |
| 2016/0377099 A1* | 12/2016 | Stauder | B60T 13/746 92/136 |
| 2018/0093653 A1* | 4/2018 | Bull | B60T 1/10 |
| 2018/0328430 A1* | 11/2018 | Feigel | F16D 65/183 |
| 2020/0133295 A1* | 4/2020 | Indrakanti | G06K 9/6289 |
| 2020/0361437 A1* | 11/2020 | Esnee | F16D 55/226 |
| 2021/0188232 A1* | 6/2021 | Mayr | B60T 13/686 |
| 2021/0291665 A1* | 9/2021 | Liu | B60T 13/745 |

\* cited by examiner

ELECTRIC BOOSTER FOR AUTONOMOUS VEHICLE HAVING DUAL ACTUATOR

CROSS-REFERENCE TO RELATED APPLICATIONS

This application claims priority under 35 U.S.C. § 119 to Korean Patent Application No. 10-2020-0058899, filed on May 18, 2020, the disclosure of which is incorporated herein by reference in its entirety.

BACKGROUND

1. Field of the Disclosure

The present disclosure relates to an electric brake booster for an autonomous vehicle having a dual actuator, and more particularly, to an electric brake booster that reduces a capacity of the actuator by cooperatively operating two actuators that generate braking pressure in an autonomous vehicle.

2. Description of the Related Art

An electric brake booster system is a type of braking system using an electric motor or an actuator unlike a mechanical or hydraulic booster system in the related art. In the electric brake booster system, a piston is advanced by rotational motion of a motor, such that braking pressure is formed in a master cylinder.

Typically, in the electric brake booster system, when a driver engages a brake pedal, a pedal effort sensor detects a pedal effort of the driver, and an electronic controller (ECU) operates a motor of a booster based on values detected by the pedal effort sensor and transmits boosted force to the master cylinder. The master cylinder transmits hydraulic pressure to wheel brakes based on the boosted force transmitted from the booster.

Meanwhile, the electric brake booster may include a main actuator and a redundancy actuator, thereby forming a redundancy braking system. In other words, the redundancy braking system generates hydraulic braking pressure by operating only the main actuator, which is a high-output motor, during normal operation, whereas the redundancy braking system generates hydraulic braking pressure by operating the redundancy actuator, which is a low-output motor, when the main actuator is broken down. In particular, the high-output motor is used as the main actuator, and the low-output motor is used as the redundancy actuator.

A related art relevant to the redundancy braking system discloses an electronic brake system that includes a master cylinder configured to generate braking pressure based on a pedal effort applied to a brake pedal, and a redundancy control device configured to transmit the liquid pressure generated using a motor and a pump to wheel cylinders provided in respective vehicle wheels, in which braking pressure is generated by the master cylinder during normal operation of the system, and braking pressure is generated by rotating the motor (redundancy actuator) after operating a flow control valve when the system does not normally operate.

However, since the high-output motor is used as the main actuator, the cost, weight, and size are increased due to an increase in capacity of the motor, which is disadvantageous for packaging. In addition, in a case in which the main actuator and the redundancy actuator are separately configured in the redundancy braking system, the system is complex and inefficient. In addition, in a case in which the redundancy braking system is operated only with the redundancy actuator, performance deteriorates in comparison with the main actuator since the low-output motor is used as the redundancy actuator.

SUMMARY

The present disclosure provides a new type of disclosure that reduces a capacity of a motor by implementing one package in which a main actuator and a redundancy actuator are symmetric and by simultaneously operating the main actuator and the redundancy actuator.

In order to achieve the above-mentioned object, the present disclosure provides an electric brake booster for an autonomous vehicle having a dual actuator, the electric brake booster may include: a body part configured to receive a power cylinder for generating braking pressure in an autonomous driving/braking mode and a master cylinder for generating braking pressure in a manual driver braking mode; a driving shaft movable in an axial direction in the power cylinder and coupled to a piston; a first motor connected to a first side of the driving shaft and configured to provide driving power to the driving shaft; a second motor connected to a second side of the driving shaft and configured to provide driving power to the driving shaft in a direction equal to a direction of the driving power provided from the first motor; and a controller configured to determine whether the first motor or the second motor normally operates and to simultaneously or separately operate the first motor and the second motor based on a magnitude of the pressure in the power cylinder or on whether emergency braking occurs.

Any one of the first motor and the second motor may have a hollow structure to receive the piston therein and move the piston. The first motor and the second motor may be connected to independent power sources, respectively, and supplied with electric power. Motor position sensors may be connected to the first motor and the second motor, respectively, to detect rotation positions of rotors of the motors. A pressure sensor may be connected to the power cylinder to detect the pressure in the power cylinder.

The master cylinder and the power cylinder may intersect each other, and the first motor and the second motor may be provided at both sides of the body part with the master cylinder interposed therebetween. In response to determining that any one of the first motor and the second motor is broken down, the controller may be configured to operate the other normal motor. In response to determining that any one of the first motor and the second motor is broken down, the controller may be configured to operate the other normal motor from a rotation position detected by the motor position sensor.

Additionally, in response to determining that both the first motor and the second motor are broken down, the controller may be configured to switch from the autonomous driving mode to the manual driver braking mode. When a current situation is not an emergency braking situation or the pressure in the power cylinder is less than a predetermined reference pressure, the controller may be configured to operate only one of the first motor and the second motor. When a current situation is an emergency braking situation or the pressure in the power cylinder is greater than a predetermined reference pressure, the controller may be configured to simultaneously operate the first motor and the second motor.

When the controller distributes driving power by simultaneously operating the first motor and the second motor, the controller may be configured to distribute the driving power so that at least one motor has the driving power less than a capacity thereof. When the controller distributes driving power by simultaneously operating the first motor and the second motor, the controller may be configured to distribute the driving power at a predetermined ratio.

According to the present disclosure, the capacity of the motor may be reduced since the first motor and the second motor may be operated simultaneously, and the packaging may be reduced since the first motor and the second motor are symmetrically arranged at both sides of the body part. According to the present disclosure, there is an effect of improving braking performance by operating the dual actuator in the event of emergency braking. Additionally, when any one of the first motor and the second motor is broken down, it is may be to minimize a delay of response by adjusting a position of the normal motor.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
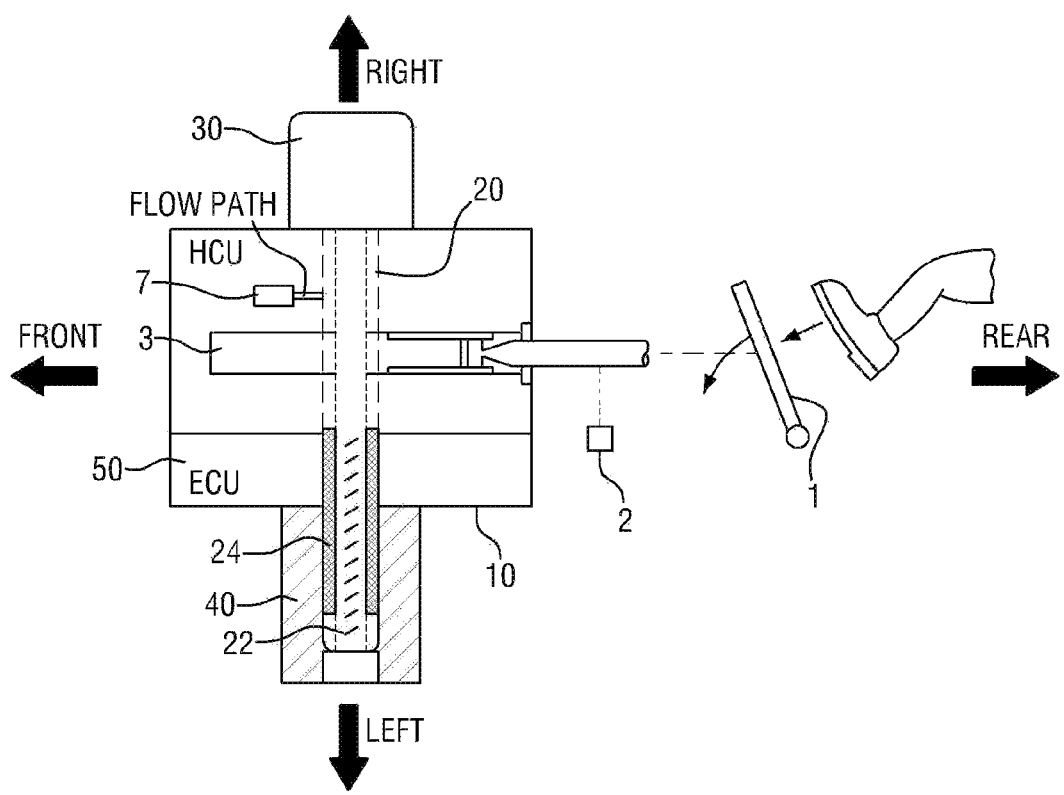
FIG. 1 is a view schematically illustrating an overall configuration of an electric brake booster for an autonomous vehicle having a dual actuator according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of an electric brake booster for an autonomous vehicle having a dual actuator according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

The electric brake booster for an autonomous vehicle having the dual actuator according to the exemplary embodiment of the present disclosure may include a booster device configured to switch between an autonomous driving/braking mode or a manual driver braking mode. In the booster device in the manual driver braking mode, when a driver engages a brake pedal 1, a pedal effort sensor 2 may be configured to detect a pedal effort of the driver, and a controller 50 may be configured to operate a motor (not illustrated) of the booster based on values detected by the pedal effort sensor 2 and transmit boosted force to a master cylinder 3 and thus to a brake. In the exemplary embodiment of the present disclosure, a configuration of the booster device in the manual driver braking mode may be similar to a configuration of a well-known electric brake booster device.

In the autonomous driving/braking mode, the booster device may be configured to operate the dual actuator based on braking force required for an autonomous driving controller (not illustrated) and transmit boosted force to a power cylinder 20 and thus to the brake. In the present specification, the description will be made by focusing on the booster device in the autonomous driving/braking mode. Meanwhile, hydraulic pressure generated in the respective braking modes may be adjusted by valve control of a hydraulic control unit (HCU).

Figure 2:
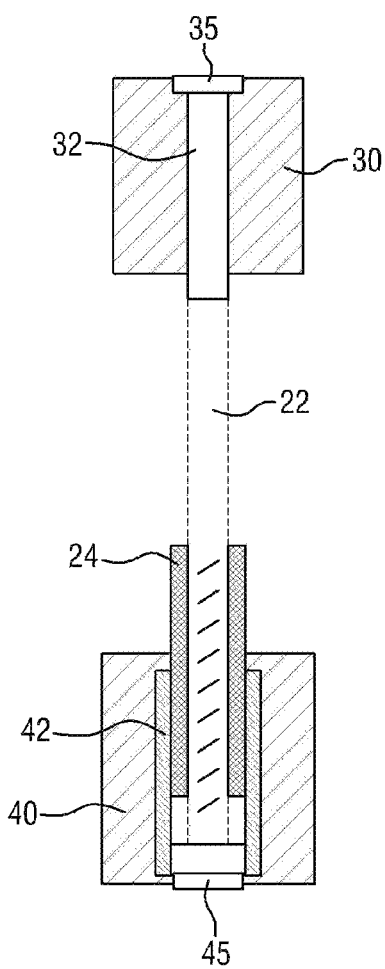
FIG. 2 is a view illustrating an internal configuration of the dual actuator illustrated in FIG. 1 according to an exemplary embodiment of the present disclosure.

FIG. 1 is a view schematically illustrating an overall configuration of the electric brake booster for an autonomous vehicle having the dual actuator according to the exemplary embodiment of the present disclosure, and FIG. 2 is a view illustrating a configuration of the dual actuator illustrated in FIG. 1. Meanwhile, FIG. 1 is a view illustrating the electric brake booster according to the exemplary embodiment of the present disclosure when viewed from above.

Referring to FIG. 1, the electric brake booster for an autonomous vehicle having the dual actuator according to the exemplary embodiment of the present disclosure may include the master cylinder 3 received in a body part 10, a power cylinder 20, a driving shaft 22, a first motor 30, a second motor 40, and the controller 50. The master cylinder 3 may be connected to the brake pedal 1 and may be configured to generate braking pressure based on the driver's intention. As illustrated in FIG. 1, the master cylinder 3 according to the exemplary embodiment of the present disclosure may be structured to be disposed in a front-rear direction of the body part 10.

The power cylinder 20 may be configured to generate braking pressure based on a control signal that corresponds to braking force required for the autonomous driving controller (not illustrated). As illustrated in FIG. 1, the power cylinder 20 according to the exemplary embodiment of the present disclosure may be disposed in a left-right direction of the body part 10. Therefore, in the body part 10, the master cylinder 3 and the power cylinder 20 may be disposed in the directions that intersect each other. The disposition of the master cylinder 3 and the power cylinder 20 is not limited, but the master cylinder 3 and the power cylinder 20 may be disposed approximately perpendicular to each other.

A flow path, which is a movement route for a fluid, may be formed in the power cylinder 20, and a driving shaft 22 may be inserted into the power cylinder 20. A thread may be formed on an outer circumferential surface of the driving shaft 22, and the driving shaft 22 may be coupled to a piston 24. Therefore, the piston 24 may be advanced and retracted as the driving shaft 22 rotates, and as a result, the hydraulic pressure may be formed or eliminated in the flow path. Meanwhile, a pressure sensor 7 connected to the flow path may be configured to sense, in real time, the pressure in the flow path.

Referring to FIG. 2, the first motor 30 may be connected to a first portion of the driving shaft 22, and the second motor 40 may be connected to a second portion of the driving shaft 22. As illustrated in FIG. 1, the first motor 30 and the second motor 40 may be connected to the driving shaft 22 and may be symmetrically disposed at both left and right sides of the body part 10, thereby integrally forming one package.

Any one of the first motor 30 and the second motor 40 may be configured as a main actuator, and the other of the first motor 30 and the second motor 40 may be configured as a redundancy actuator, thereby implementing a redundancy braking system. A capacity of the main actuator is inevitably increased in a case in which only the main actuator operates at normal times and the redundancy actuator operates in the event of emergency in the redundancy braking system. The costs and weight are increased when the high-output motor is used as the main actuator, which is disadvantageous to packaging due to an increase in size and causes a problem with noise, vibration, and harshness (NVH) and durability due to an asymmetric weight structure. According to the exemplary embodiment of the present disclosure, the first motor 30 and the second motor 40 may be configured to operate even at normal times (e.g., during no failure, emergency, malfunction, etc.), and as a result, it may be possible to reduce the capacity of the main actuator and solve the above-mentioned problems because of the symmetric weight structure.

In the first motor 30, a first rotor 32 extends outward and connects to a first end of the driving shaft 22. Therefore, the driving shaft 22 also rotates in a rotation direction of the first rotor 32. A first motor position sensor 35 may be connected to one side of the first motor 30. The first motor position sensor 35 may be configured to detect, in real time, a rotation position or a rotation angle of the first rotor 32 that varies based on the operation of the first motor 30.

The second motor 40 has a hollow structure so that a second rotor 42 is positioned in the motor. The second rotor 42 has a cylindrical shape, and a second side of the driving shaft 22 may be received in the second rotor 42 and connected to the second rotor 42. Specifically, the piston 24 may be formed at the second side of the driving shaft 22, and an outer surface of the piston 24 may be connected to an inner surface of the second rotor 42. Therefore, the driving shaft 22 may also rotate in a rotation direction of the second rotor 42. A second motor position sensor 45 may be connected to one side of the second motor 40. The second motor position sensor 45 may be configured to detect, in real time, a rotation position or a rotation angle of the second rotor 42 that varies based on the operation of the second motor 40.

The first rotor 32 and the second rotor 42 may be connected to the same driving shaft 22. Therefore, the rotation positions of the first rotor 32 and the second rotor 42, which are measured by the first motor position sensor 35 and the second motor position sensor 45, may be detected as an equal value. The first motor 30 and the second motor 40 may be connected to independent power sources, respectively, and supplied with electric power. Therefore, in a case in which there is a problem in that any one of the first motor 30 and the second motor 40 cannot be supplied with electric power, the other motor may operate.

Meanwhile, the first motor 30 may be selected as the main actuator and the second motor 40 may be selected as the redundancy actuator, and vice versa. In addition, the first motor 30 and the second motor 40 illustrated in FIG. 2 may have the opposite structures (e.g., the first motor 30 may have the hollow structure). In the autonomous driving/braking mode, the controller 50 may be configured to determine a specific condition and determine whether to operate the first motor 30 and the second motor 40 based on the specific condition.

The controller 50 may be configured to determine whether the first motor 30 or the second motor 40 satisfies a normal operational condition. Whether the motor operates normally (e.g., without malfunction or error) may be determined by detecting, in real time, by the motor position sensors 35 and 45, whether the rotation position or the rotation angle of the motor varies when the electric current is applied to the motor. For example, when the rotation position does not vary even though the electric current is applied to the first motor 30, the controller 50 may be configured to determine that the first motor 30 is broken down or has failed.

In response to determining that the first motor 30 and the second motor 40 are normal, the controller 50 may be configured to determine whether the first motor 30 and the second motor 40 satisfy an emergency braking condition or a pressure condition. In particular, the emergency braking condition or the pressure condition may be determined simultaneously. When an emergency braking situation occurs while the vehicle travels in an autonomous driving mode, high braking force may be required. Therefore, to satisfy the braking force, the controller 50 may be configured to operate both the first motor 30 and the second motor 40. The emergency braking condition may be set by detecting sensing values by the pressure sensor 7.

On the contrary, when the current situation is not the emergency braking situation, the controller may be configured to determine whether the pressure in the power cylinder 20 satisfies the pressure condition. The pressure condition may be set by comparing the pressure in the power cylinder 20 detected by the pressure sensor 7 with a predetermined reference pressure. In particular, the reference pressure may be set in consideration of the capacity of the first motor 30 or the second motor 40. For example, assuming that a capacity of the first motor 30, which is the main actuator, is 100 and a capacity of the second motor 40, which is the redundancy actuator, is 60, the reference pressure, which is converted into driving power of the motor, may be set to a value smaller than 100.

Since sufficient braking force may be generated by the first motor 30 when the pressure in the power cylinder 20 is less than the reference pressure, the controller 50 may be configured to operate only the first motor 30. On the contrary, when the pressure in the power cylinder 20 is greater than the reference pressure, the controller 50 may be configured to operate both the first motor 30 and the second motor 40. In particular, various methods may be used to distribute the driving power to the first motor 30 and the second motor 40. In the present specification, a first distribution method and a second distribution method will be described.

According to the first distribution method, reference driving power, which is set to be less than the capacity of the first motor 30, may be distributed to the first motor 30, and a remaining amount of driving power may be distributed to the second motor 40. In the above-mentioned example, when the value, which is made by converting the pressure in the power cylinder 20 into the driving power of the motor, is 120 and the reference driving power of the first motor 30 is set to 80, the controller 50 may be configured to distribute the driving power of 80 to the first motor 30 and distribute the driving power of 40 to the second motor 40. Of course, the reference pressure, which is converted into the driving power of the motor, and the reference driving power may be set to an equal value or different values. The first distribution method is a distribution method of a concept of a fixed value in which any one motor driving power may be set to a predetermined reference value.

According to the second distribution method, the driving power may be distributed to the first motor 30 and the second motor 40 in accordance with a predetermined ratio. In the above-mentioned example, assuming that the value, which is made by converting the pressure in the power cylinder 20 into the driving power of the motor, is 120 and the predetermined ratio is "First Motor:Second Motor=6:4", the controller 50 may be configured to distribute the driving power of 72 to the first motor 30 and distribute the driving power of 48 to the second motor 40. The second distribution method is a distribution method of a concept of fixed ratio.

Even though the first distribution method and the second distribution method are applied, the controller 50 may be configured to distribute maximum driving power to the respective motors when a magnitude of the pressure of the power cylinder 20 is increased and the maximum capacities of the respective motors 30 and 40 are required. In the exemplary embodiment of the present disclosure, when the first motor 30 and the second motor 40 rotate in the same direction, both the driving power of the first motor 30 and the driving power of the second motor 40 may be applied to satisfy the braking pressure required for the autonomous driving controller (not illustrated), and as a result, it may be possible to prevent any one motor from being required to apply excessive driving power.

Meanwhile, in response to determining that any one of the first motor 30 and the second motor 40 is broken down, the controller 50 may be configured to determine whether the other motor is normal. In response to determining that the other motor is also broken down, the autonomous driving/braking mode is unable to be performed any further, the controller 50 may be configured to switch to the manual driver braking mode. In the manual driver braking mode, a valve in the hydraulic control unit (HCU) is operated, and braking force is generated by the pedal effort of the driver.

On the contrary, in response to determining that the other motor is normal, the controller 50 may be configured to continuously operate the normal motor. In particular, the controller 50 may be configured to determine a breakdown point in time as a point in time at which a rotation position or a rotation angle is finally input from the broken-down motor, and the controller 50 may be configured to determine a breakdown position as a rotation position of the rotor input from the motor position sensors 35 and 45. Therefore, the controller 50 may be configured to operate the normal motor after the breakdown point in time and continuously operate the normal motor from the breakdown position.

Since the determination of whether the motor is broken down and the adjustment of the position of the normal motor by the controller 50 may be rapidly performed in real time, it may be possible to minimize a delay of response and thus to prevent a delay of braking felt by an occupant in the vehicle. Meanwhile, in this case, since a dangerous situation may occur if the pressure in the power cylinder 20 exceeds the capacity of the normal motor, the controller 50 may be configured to output a warning message or switch to the manual driver braking mode.

Figure 3:
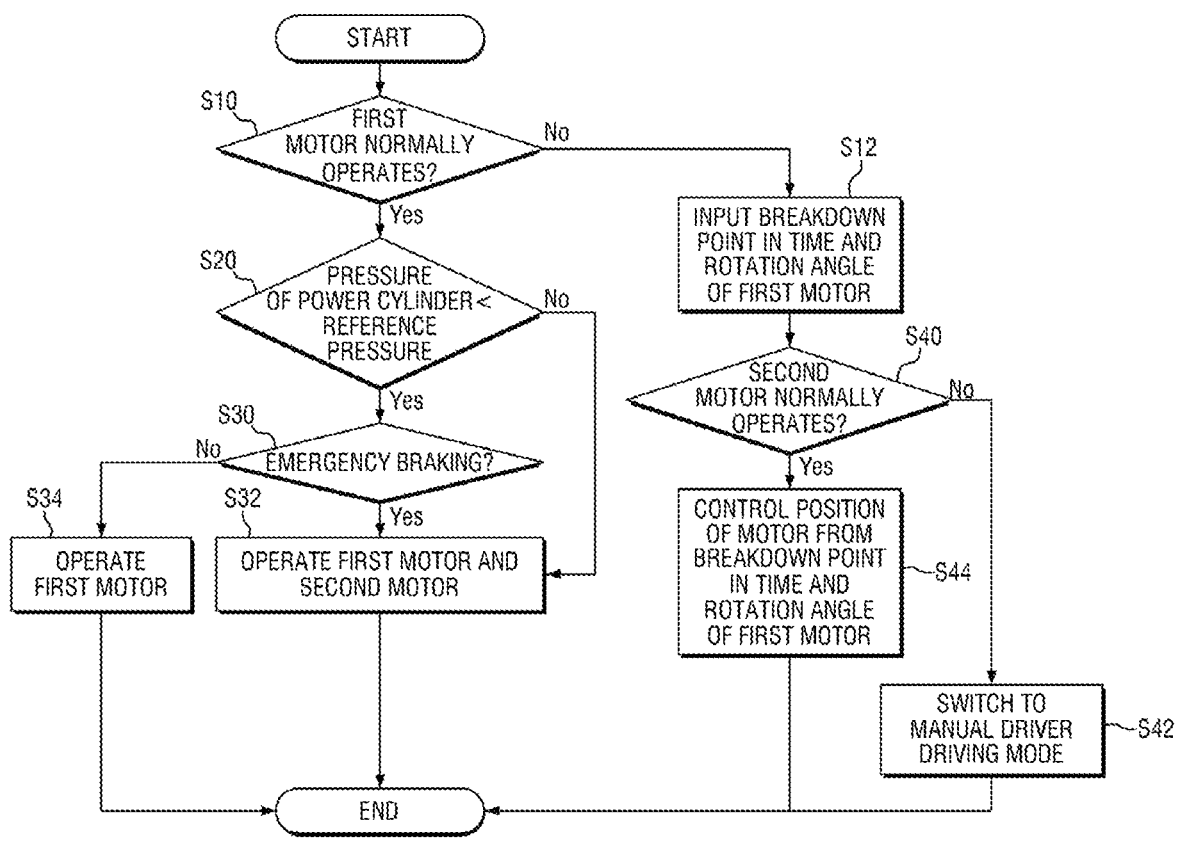
FIG. 3 is a flowchart illustrating a process of controlling the electric brake booster for an autonomous vehicle having the dual actuator according to the exemplary embodiment of the present disclosure.

FIG. 3 is a flowchart illustrating a process of controlling the electric brake booster for an autonomous vehicle having the dual actuator according to the exemplary embodiment of the present disclosure. Hereinafter, a process of controlling the electric brake booster for an autonomous vehicle having the dual actuator according to the exemplary embodiment of the present disclosure will be described with reference to FIG. 3.

First, the controller 50 may be configured to determine whether the first motor 30 operates normally (S10). In response to determining that the first motor 30 is operating normally, the controller may be configured to determine whether the pressure in the power cylinder 20 is less than the reference pressure (S20). In particular, the controller may be configured to simultaneously operate the first motor 30 and the second motor 40 (S32) if the pressure in the power cylinder 20 is greater than the reference pressure, and the controller may be configured to determine whether the emergency braking situation occurs (S30) if the pressure in the power cylinder 20 is less than the reference pressure. The controller 50 may be configured to operate the first motor 30 (S34) if the current situation is not the emergency braking situation, and the controller 50 may be configured to simultaneously operate the first motor 30 and the second motor 40 (S32) if the current situation is the emergency braking situation.

Meanwhile, in response to determining that the first motor 30 is not operating normally, the controller 50 may be configured to receive the breakdown point in time and the breakdown position of the first motor 30 (S12) and determine whether the second motor 40 is operating normally (S40). In response to determining that the second motor 40 is broken down, the controller 50 may be configured to switch from the autonomous driving/braking mode to the manual driver braking mode (S42). In contrast, in response to determining that the second motor 40 is operating normally, the controller 50 may be configured to operate the second motor 40 from the received breakdown point in time and the received breakdown position (S44).

The present disclosure has been described with reference to the limited exemplary embodiments and the drawings, but the present disclosure is not limited thereto. The described exemplary embodiments may be variously changed or modified by those skilled in the art to which the present disclosure pertains within the technical spirit of the present disclosure and within the scope equivalent to the appended claims.

What is claimed is:

1. An electric brake booster for an autonomous vehicle having a dual actuator, comprising:
    a body part configured to receive a power cylinder for generating braking pressure in an autonomous driving/braking mode;
    a driving shaft movable in an axial direction in the power cylinder and coupled to a piston;
    a first motor connected to a first side of the driving shaft and configured to provide driving power to the driving shaft;
    a second motor connected to a second side of the driving shaft and configured to provide driving power to the driving shaft in a direction equal to a direction of the driving power provided from the first motor; and
    a controller configured to determine whether the first motor or the second motor operates normally and to simultaneously or separately operate the first motor and the second motor based on a magnitude of the pressure in the power cylinder or on whether emergency braking occurs;
    wherein any one of the first motor and the second motor has a hollow structure to receive the piston therein and move the piston.

2. The electric brake booster of claim 1, wherein the body part further comprises a master cylinder for generating braking pressure in a manual driver braking mode.

3. The electric brake booster of claim 1, wherein the first motor and the second motor are connected to independent power sources, respectively, and supplied with electric power.

4. The electric brake booster of claim 1, wherein motor position sensors are connected to the first motor and the second motor, respectively, to detect rotation positions of rotors of the motors.

5. The electric brake booster of claim 1, wherein a pressure sensor is connected to the power cylinder to detect the pressure in the power cylinder.

6. The electric brake booster of claim 2, wherein the master cylinder and the power cylinder are configured to intersect each other, and the first motor and the second motor are provided at both sides of the body part with the master cylinder interposed therebetween.

7. The electric brake booster of claim 1, wherein in response to determining that any one of the first motor and the second motor is broken down, the controller is configured to operate any one of the first motor and the second motor that is determined not to be broken down.

8. The electric brake booster of claim 4, wherein in response to determining that any one of the first motor and the second motor is broken down, the controller is configured to operate any one of the first motor and the second motor that is not determined to be broken down from a rotation position detected by the motor position sensor.

9. The electric brake booster of claim 2, wherein in response to determining that both the first motor and the second motor are broken down, the controller is configured to switch from the autonomous driving mode to the manual driver braking mode.

10. The electric brake booster of claim 1, wherein when a current situation is not an emergency braking situation or the pressure in the power cylinder is less than a predetermined reference pressure, the controller is configured to operate one of the first motor and the second motor.

11. The electric brake booster of claim 1, wherein when a current situation is an emergency braking situation or the pressure in the power cylinder is greater than a predetermined reference pressure, the controller is configured to simultaneously operate the first motor and the second motor.

12. The electric brake booster of claim 1, wherein when the controller distributes driving power by simultaneously operating the first motor and the second motor, the controller is configured to distribute the driving power so that at least one motor has the driving power less than a capacity thereof.

13. The electric brake booster of claim 1, wherein when the controller distributes driving power by simultaneously operating the first motor and the second motor, the controller is configured to distribute the driving power at a predetermined ratio.

14. An electric brake booster for an autonomous vehicle having a dual actuator, comprising:
    a body part configured to receive a power cylinder for generating braking pressure in an autonomous driving/braking mode, wherein the body part further comprises a master cylinder for generating braking pressure in a manual driver braking mode;
    a driving shaft movable in an axial direction in the power cylinder and coupled to a piston;
    a first motor connected to a first side of the driving shaft and configured to provide driving power to the driving shaft;
    a second motor connected to a second side of the driving shaft and configured to provide driving power to the driving shaft in a direction equal to a direction of the driving power provided from the first motor; and
    a controller configured to determine whether the first motor or the second motor operates normally and to simultaneously or separately operate the first motor and the second motor based on a magnitude of the pressure in the power cylinder or on whether emergency braking occurs;
    wherein the master cylinder and the power cylinder are configured to intersect each other, and the first motor and the second motor are provided at both sides of the body part with the master cylinder interposed therebetween.

* * * * *